(12) United States Patent
Marche et al.

(10) Patent No.: US 8,474,750 B2
(45) Date of Patent: Jul. 2, 2013

(54) ENGINE ATTACHMENT PYLON COMPRISING MEANS OF FASTENING SPARS AND PANELS LOCATED OUTSIDE THE INNER SPACE IN THE BOX

(75) Inventors: Jacques Herve Marche, Toulouse (FR); Fabien Raison, Plaisance du Touch (FR)

(73) Assignee: Airbus Operations S.A.S., Toulouse (FR)

( * ) Notice: Subject to any disclaimer, the term of this patent is extended or adjusted under 35 U.S.C. 154(b) by 305 days.

(21) Appl. No.: 12/989,430

(22) PCT Filed: May 12, 2009

(86) PCT No.: PCT/FR2009/050860
§ 371 (c)(1),
(2), (4) Date: Oct. 25, 2010

(87) PCT Pub. No.: WO2009/147341
PCT Pub. Date: Dec. 10, 2009

(65) Prior Publication Data
US 2011/0036942 A1    Feb. 17, 2011

(30) Foreign Application Priority Data
May 14, 2008  (FR) ...................................... 08 53115

(51) Int. Cl.
*B64D 27/00*    (2006.01)
(52) U.S. Cl.
USPC .......................................... 244/54; 244/53 R
(58) Field of Classification Search
USPC ...... 244/54, 53 R; 60/796–798; 248/554–557
See application file for complete search history.

(56) References Cited

U.S. PATENT DOCUMENTS

| 3,357,657 | A | * | 12/1967 | Ferrel et al. ..................... 244/54 |
| 4,044,973 | A | * | 8/1977 | Moorehead ..................... 244/54 |
| 4,560,122 | A | * | 12/1985 | Parkinson et al. .............. 244/54 |
| 4,725,019 | A | * | 2/1988 | White ............................. 244/54 |
| 6,095,456 | A | * | 8/2000 | Powell ............................. 244/54 |
| 6,126,110 | A | * | 10/2000 | Seaquist et al. .................. 244/54 |
| 6,138,949 | A | * | 10/2000 | Manende et al. .......... 244/17.27 |
| 6,398,161 | B1 | * | 6/2002 | Jule et al. ........................ 244/54 |
| 7,296,768 | B2 | * | 11/2007 | Machado et al. ................ 244/54 |
| 8,205,825 | B2 | * | 6/2012 | Huggins et al. ................. 244/54 |
| 2005/0178889 | A1 | * | 8/2005 | Machado et al. ................ 244/54 |
| 2008/0169377 | A1 | * | 7/2008 | Levert ............................. 244/54 |
| 2008/0217502 | A1 | * | 9/2008 | Lafont ............................ 248/554 |
| 2008/0251634 | A1 | * | 10/2008 | Bernardi et al. ................. 244/54 |

FOREIGN PATENT DOCUMENTS

| EP | 1 538 081 A1 | 6/2005 |
| FR | 1.157.062 | 5/1958 |
| FR | 1157062 | * 5/1958 |
| FR | 2 891 803 | 4/2007 |

OTHER PUBLICATIONS

International Search Report issued Dec. 30, 2009, in Patent Application No. PCT/FR2009/050860.

* cited by examiner

*Primary Examiner* — Tien Dinh
*Assistant Examiner* — Justin Benedik
(74) *Attorney, Agent, or Firm* — Oblon, Spivak, McClelland, Maier & Neustadt, L.L.P.

(57) ABSTRACT

An engine attachment pylon for an aircraft including a rigid structure including a box including an upper spar and a lower spar, connected to each other through two lateral panels. At least one of the upper and lower ends of the web of at least one of the two lateral panels includes at least one assembly cleat projecting sideways from the web towards the outside of the box, and assembled to the spar on which it bears through an attachment mechanism located outside the inner space in the box.

12 Claims, 3 Drawing Sheets

ENGINE ATTACHMENT PYLON COMPRISING MEANS OF FASTENING SPARS AND PANELS LOCATED OUTSIDE THE INNER SPACE IN THE BOX

TECHNICAL FIELD

This invention relates in general to an engine attachment pylon for an aircraft such as a turbojet. This type of attachment pylon is also called an EMS (Engine Mounting Structure), and for example can be used to suspend the turbojet below the aircraft wing, using an assembly system comprising a plurality of engine attachments.

STATE OF PRIOR ART

Such an attachment pylon is designed to form an attachment interface between an engine such as a turbojet and the aircraft wing. It transmits forces generated by its associated turbojet to the structure of this aircraft, and it also enables routing of fuel, electrical, hydraulic and air systems between the engine and the aircraft.

In order to transmit forces, the pylon comprises a rigid structure, also called the primary structure, frequently of the "box" type, in other words formed by the assembly of upper and lower spars and two lateral panels, preferably through bolt type attachment means, connecting them to transverse ribs located in an inner space within the box.

The disadvantage of such a solution is in the need to provide several accesses inside the box to install and assemble attachment means for the components of this box. For example, these accesses may be in the form of "doors" or "openings" formed on the spars and the panels. Nevertheless, regardless of the adopted design, access for the operator is always difficult, which increases assembly and manufacturing times.

SUMMARY OF THE INVENTION

Therefore, the purpose of the invention is to propose an aircraft engine attachment pylon at least partially overcoming the disadvantage mentioned above related to embodiments according to prior art, and also to present an engine assembly for an aircraft with at least one such pylon.

To achieve this, the object of the invention is an engine attachment pylon for an aircraft, said pylon comprising a rigid structure provided with a box, formed using an upper spar and a lower spar connected to each other by two lateral panels, each lateral panel comprising a web delimiting a side space inside said box and with an upper end of the web facing the upper spar and a lower end of the web facing the lower spar. According to the invention, at least the upper or the lower end of the web of at least one of the lateral panels has at least one assembly cleat projecting sideways from the web towards the outside of the box, and is assembled to the spar on which it bears through attachment means located outside said inner space in the box.

The design of the pylon according to the invention no longer requires any access inside the box to put said attachment means into place, since the portions to be assembled are located outside the space inside the box. Consequently, the assembly time is advantageously shortened, particular because the work to be done by the operator performing the task is made easier.

Nevertheless, the pylon may still comprise transverse ribs inside the box, connecting the lateral panels and the lower and upper spars to each other, through other attachment means that do require access inside the box. However, the design is such that the number of these inner ribs is minimised, for example less than four and preferably less than two, at a spacing form each other in addition to the forward and aft box closing ribs.

Consequently, the number of "doors" or "openings" in the lateral panels and the spars may be smaller than the number encountered in embodiments according to prior art, which is advantageous in terms of mass and manufacturing time.

Preferably, each of the upper and lower ends of the web of each of the lateral panels has at least one assembly cleat projecting sideways from the web towards the outside of the box, and assembled to the spar on which it bears through attachment means located outside said inner space in the box.

Preferably, each assembly cleat runs continuously along its associated spar, along almost the entire length of the associated spar. An alternative would be to provide a cleat that runs along only part of its associated spar, either continuously or discontinuously. Another alternative would be for each assembly cleat to run discontinuously along almost the entire length of the associated spar.

Preferably, said attachment means are bolts or rivets, or similar elements.

Preferably, the pylon also comprises two lateral aerodynamic skins fixed on the box of the rigid structure, each facing the webs of said lateral panels and at a distance from them.

Thus, this special feature means that the structural function can be dissociated from the aerodynamic function of the pylon lateral parts, the structural function being performed by the lateral panels, and the aerodynamic function being performed by these lateral skins covering the panels. In dissociating the functions in this way, it becomes possible to achieve a high performance aerodynamic form, without changing the manufacturing and mechanical strength of the pylon. In particular, the aft portion of the pylon can simultaneously have slightly curved lateral aerodynamic skins, perfectly adapted to narrowing of the pylon in this aft part, and approximately plane structural lateral panels giving better mechanical strength.

Preferably, each lateral skin and its associated lateral panel jointly form a compartment of the pylon through which hydraulic and/or electrical systems can pass. This facilitates access to these systems for operators simply by removing the lateral skins, particularly by comparison with embodiments according to prior art in which these systems are usually provided in the upper part of the pylon, above the upper box spar. Advantageously, with the pylon according to the invention, there is no need for any electrical or hydraulic equipment to be located above the box upper spar since this equipment is now housed in the above-mentioned lateral compartments.

Preferably, the lateral skins and the lateral panels jointly form two pylon compartments arranged on each side of the inner space in the box, with hydraulic systems passing through one of the two compartments and electrical systems passing through the other. This provides a simple and efficient means of providing the segregation required by the regulations between the two types of systems.

Finally, said inner space may be in the form of a duct through which compressed air can pass, preferably drawn off from the engine, and that will supply the inside of the aircraft, for example to satisfy aircraft pressurization needs. Alternatively, a compressed air duct could be routed through the inner space in the box.

Another object of the invention is an engine assembly for an aircraft with an engine and an engine attachment pylon like that described above. Finally, another object of the invention is an aircraft comprising at least one such engine assembly.

Other advantages and characteristics of the invention will become clear after reading the detailed non-limitative description given below.

BRIEF DESCRIPTION OF THE DRAWINGS

This description will be made with reference to the appended drawings wherein.

DETAILED DESCRIPTION OF PREFERRED EMBODIMENTS

Figure 1:
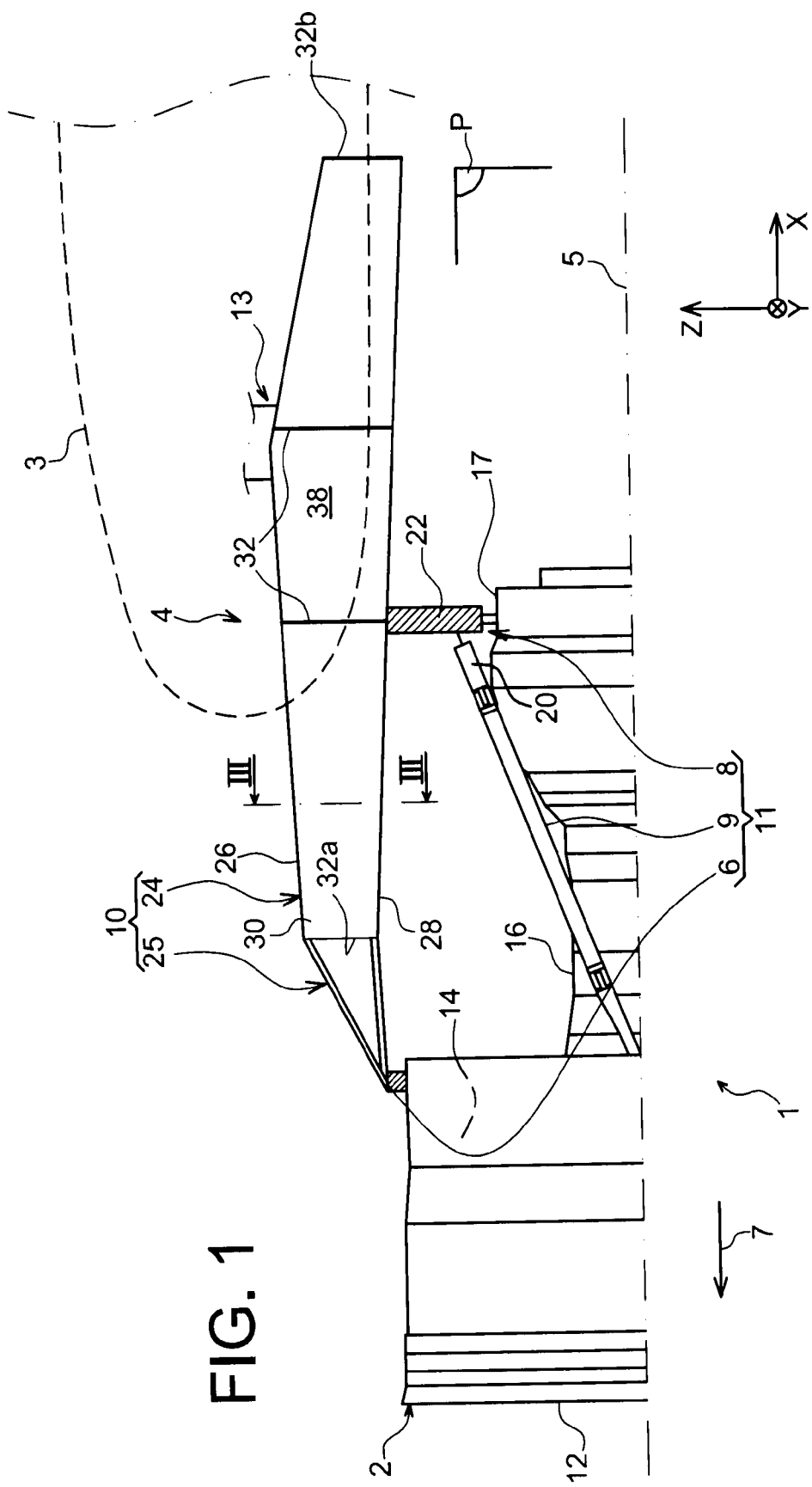
FIG. 1 shows a diagrammatic side view of an aircraft engine assembly, according to one preferred embodiment of this invention.

FIG. 1 shows an engine assembly 1 for an aircraft designed to be fixed under a wing 3 of this aircraft, this assembly 1 provided with an attachment pylon 4 being in the form of a preferred embodiment of this invention.

Globally, the engine assembly 1 comprises an engine such as a turbojet 2 and the attachment pylon 4, the attachment pylon in particular being provided with a rigid structure 10 and an assembly system 11 comprising a plurality of engine attachments 6, 8 and a device for resistance of thrusts 9 generated by the turbojet 2, therefore the assembly system 11 being inserted between the engine and the above-mentioned rigid structure 10 also called the primary structure. Note that the assembly 1 is intended to be surrounded by a pod (not shown) and that the attachment pylon 4 comprises another series of attachments 13 (shown in FIG. 2) to suspend this assembly 1 under the aircraft wing, being connected to a forward spar 19 of this wing.

By convention, throughout the following description, the X direction denotes the longitudinal direction of the pylon 4 that can also be considered to be the longitudinal direction of the turbojet 2, this X direction being parallel to a longitudinal axis 5 of this turbojet 2. Furthermore, the direction transverse to the pylon 4 is denoted Y and can be considered to be the same as the transverse direction of the turbojet 2, and Z is the vertical direction or the height, these three X, Y and Z directions being orthogonal to each other.

Furthermore, the terms <<forward>> and <<aft>> should be considered with respect to a direction of movement of the aircraft that occurs as a result of the thrust applied by the turbojet 2, this direction being shown diagrammatically by the arrow 7.

In FIG. 1, it can be seen that only the thrust resistance device 9, engine attachments 6, 8 and the rigid structure 10 of the attachment pylon 4 are shown. The other components of this pylon 4, such as the attachment means of the rigid structure 10 under the aircraft wing, or the secondary structure for segregation and maintenance of systems while supporting aerodynamic fairings, are not shown.

The turbojet 2 is provided with a large fan casing 12 at the forward end delimiting an annular fan duct 14, and being provided near the aft end with a smaller central casing 16 enclosing the core of this turbojet. Finally, the central casing 16 is prolonged in the aft end by an ejection casing 17 that is larger than the casing 16. Obviously, the casings 12, 16 and 17 are rigidly fixed to each other.

As can be seen in FIG. 1, the plurality of engine attachments is composed of a forward engine attachment 6 and an aft engine attachment 8 possibly forming two aft half-attachments as known in prior art. The thrust resistance device 9 comprises in particular two lateral thrust resistance rods (only one of which is shown in FIG. 1 because the figure shows a side view) connected firstly to a forward part of the central casing 16 at their forward ends, and secondly to a spreader beam 20 at their aft ends, this spreader beam itself being mounted on the rigid structure 10 or on an aft attachment body 22 as shown.

The forward engine attachment 6, fixed to fan casing 12, is conventionally designed so that it can resist only forces generated by the turbojet 2 along the Y and Z directions, and therefore not forces applied along the X direction. For guidance, this forward attachment 6 preferably penetrates into an upper circumferential end portion of the fan casing 12.

The aft engine attachment 8 is globally inserted between the ejecting casing 17 and the rigid structure 10 of the pylon. As mentioned above, it is preferably designed so as to be able to resist forces generated by the turbojet 2 along the Y and Z directions, but not forces applied along the X direction. Its attachment body 22 is of a known type and its design is very similar to that encountered previously, and it is mounted directly on the lower spar 28 of the box. Thus, the attachment body forms clevises on which shackles are hinged, and the shackles will also be hinged onto fittings fixed to the engine.

Thus, with the statically determinate assembly system 11, forces applied along the X direction are resisted by the device 9, and forces applied along the Y and Z directions are resisted by the forward attachment 6 and the aft attachment 8 acting in combination.

Also, the moment applied about the X direction is resisted vertically by means of the attachment 8, the moment applied about the Y direction is resisted vertically by means of the aft attachment 8 jointly with attachment 6, and the moment applied about the Z direction is resisted transversely by means of the attachment 8, jointly with the attachment 6.

FIG. 1 also shows the design of the rigid structure 10 of the attachment pylon. It firstly shows a box 24 extending over a long part of the length of the rigid structure 10 along the X direction, and therefore forms a torsion box called the main structural box. It is composed of an upper spar 26 and a lower spar 28 and two lateral panels 30 (only one of which can be seen in FIG. 1) both extending approximately vertically along the X direction. Transverse ribs 32 may be provided inside this box in YZ planes and at a longitudinal spacing from each other, these ribs reinforcing the stiffness of the box 24 and participating in the assembly of the spars 26, 28 and 30.

In one preferred embodiment there are only two inner transverse ribs 32 at a distance from each other, each possibly being doubled up. Obviously, they are additional to the forward transverse closing rib 32a of the box, and to the aft transverse closing rib 32b of the box. One of the two inner ribs 32 is located to the right of the aft attachment 8, while the other rib is located to the right of the forward attachments of the system 13 suspending the pylon under the aircraft wing.

Note that each of the elements 26, 28 and 30 may be made in a single piece, or by the assembly of contiguous sections that may possibly be slightly inclined relative to each other. Preferably, as is clearly shown in FIG. 1, the lower spar 28 is plane over its entire length, this plane being approximately parallel to or slightly inclined from an XY plane, while the upper spar 26 is interrupted at the forward attachments of the system 13.

Note that the primary structure 10 is also provided with a so-called pyramid forward end 25 fitted on the forward end of the box 24 and supporting the engine attachment 6 at its own forward end.

One of the special features of this invention lies in the construction of the box 24, and more particularly in the assembly of its components.

Figure 3:
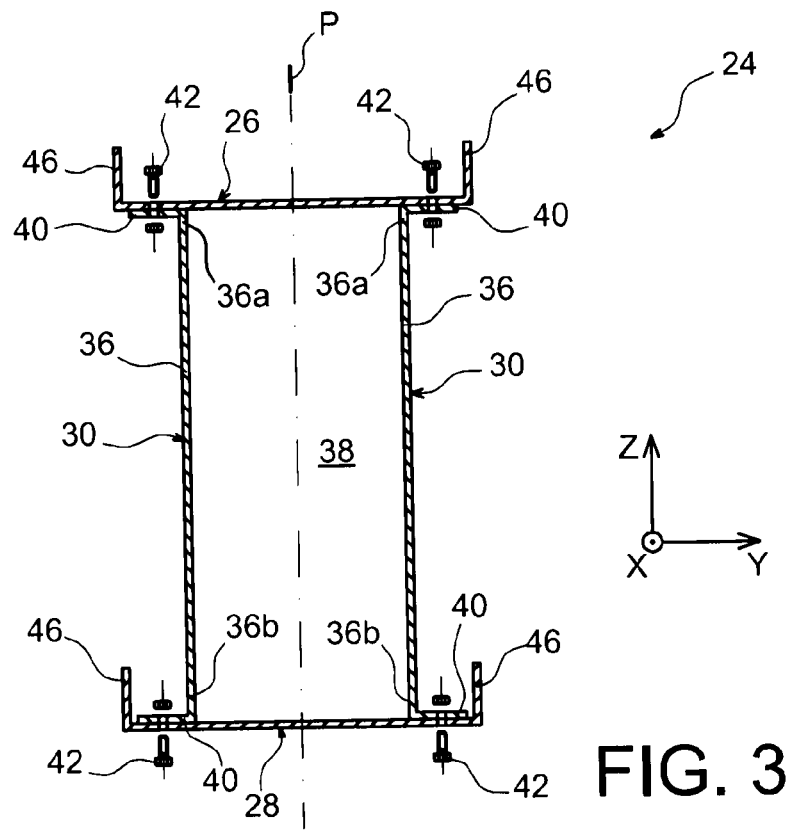
FIG. 3 shows a cross-sectional view of the rigid structure of the attachment pylon, taken along line III-III in FIG. 1.

As can be seen more clearly in FIG. 3, each lateral panel 30 therefore performs a structural role and comprises a vertical web 36 laterally delimiting an inner space 38 in the box. The web 37 comprises an upper web end 36a facing the upper spar 26, and a lower web end 36b facing the lower spar 28. Each web end 36a, 36b also comprises an assembly cleat projecting laterally from the web 36 towards the outside of the box. In other words, each assembly cleat 40 projects from its associated web end along the Y direction away from a vertical median plane P of the pylon.

These cleats 40 preferably extend continuously along the entire length of the spars 26, 28, namely over the entire length of the box 24. Each forms a bearing surface for their associated spar, a contact preferably being provided between these two elements as can be seen in FIG. 3.

The two lateral ends of the upper spar 26 bear on and are in contact over an area with the corresponding two assembly cleats 40 located at the upper web ends 36a, while the two lateral ends of the lower spar 28 bear on and are in contact over an area with the corresponding two assembly cleats 40 located at the lower web ends 36b.

The overlap zones resulting from these contacts facilitate fast and simple assembly of the elements 26, 28 and 30 with each other, through conventional attachment means such as bolts 42 or rivets passing through these overlap zones. Consequently, these attachment means 42 are located outside the box inner space 38, such that access into this box to put the bolts 42 into place is no longer necessary.

Preferably, approximately vertical bolts 42 are thus provided regularly along the entire length of the lower and upper lateral parts of the box, at the vertical overlap zones between the cleats 40 and the spars 26, 28.

Figure 2:
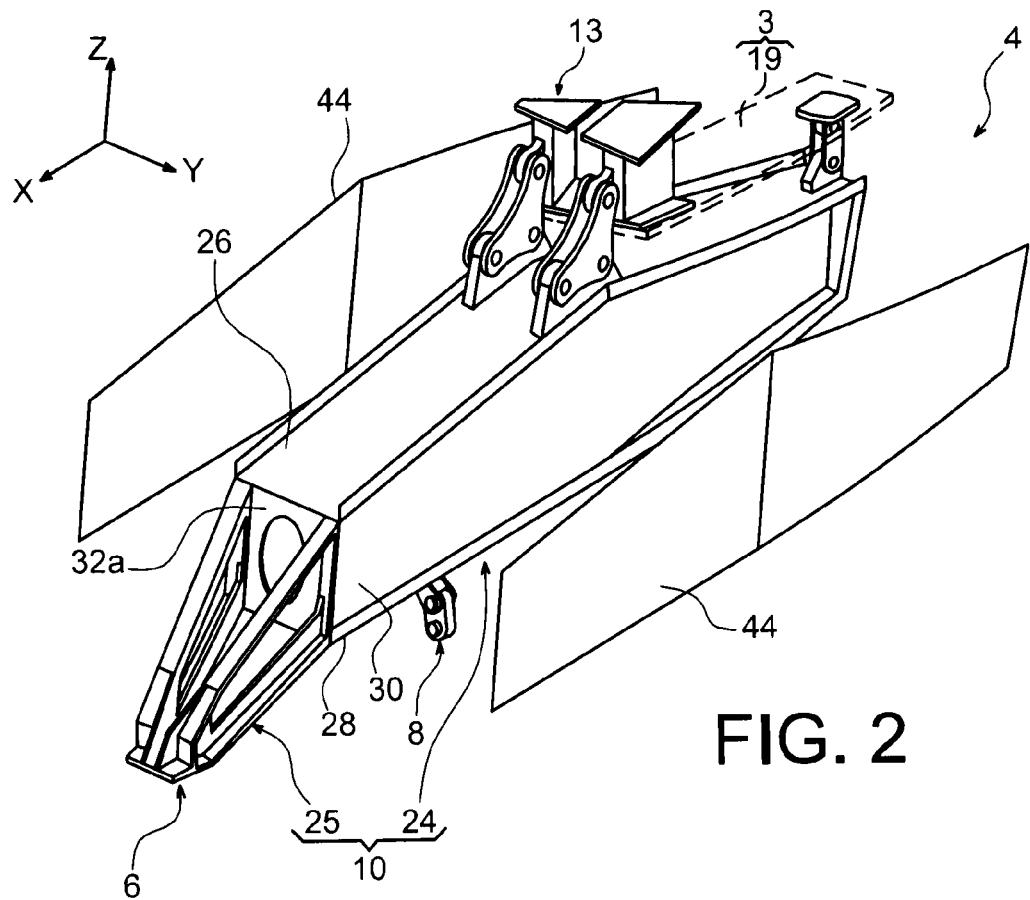
FIG. 2 shows a partial perspective view of the engine assembly attachment pylon shown in FIG. 1.

FIG. 2 shows that the pylon 4 also comprises two lateral aerodynamic skins 44 that no longer form part of the rigid structure 10 designed to resist engine forces, but that belong to said secondary structure of the pylon.

Figure 4:
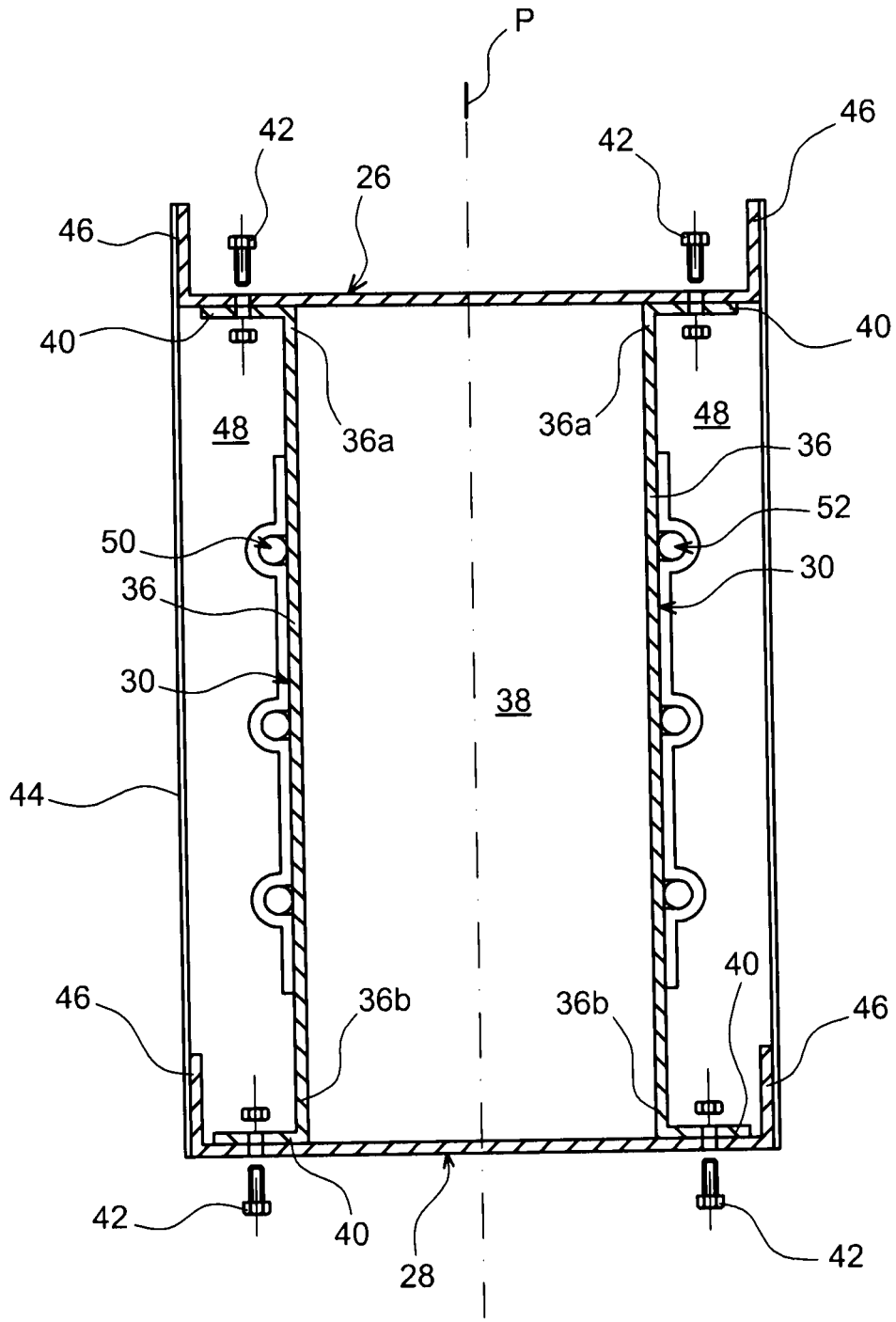
FIG. 4 shows a view similar to that shown in FIG. 3, on which the lateral aerodynamic skins and the hydraulic and electrical systems have been added.

The two lateral aerodynamic skins 44 are fixed to the box 24 as shown in FIG. 4, using conventional means such as rivets or fast assembly screws, or similar elements. Each is facing the web 36 of the lateral structural panel 36 with which it is associated, and is at a distance from it. More precisely, each lateral skin 44 bears on two secondary assembly cleats 46 at its top and bottom ends, the assembly cleats being provided at a lateral end of the upper spar 26 and at a lateral end of the lower spar 28 on the same side.

The lateral aerodynamic skins 44 are slightly curved in a top view and are therefore perfectly adapted to the narrowing of the pylon in this aft part.

As can be seen in FIG. 4, each lateral skin 44 and its associated lateral panel 30 jointly form a pylon compartment 48 located at the side of box 24 and therefore participate in the definition of this compartment through its structural panel 30.

Preferably, hydraulic systems 50 pass through one of the two compartments 48, and electrical systems 52 pass through the other compartment, therefore the box 24 alone forms the segregation between these different types of systems. Furthermore, access to these systems 50, 52 is very easy, consisting simply of removing the aerodynamic skins 44.

The inner space 38 also forms a duct through which compressed air drawn off from the engine can pass as an air supply to the aircraft.

Obviously, those skilled in the art could make various modifications to the assembly 1 and to the aircraft attachment pylon 4 that have just been described, solely as non-limitative examples. In this respect, it is worth mentioning that although the pylon 4 has been presented in an adapted configuration for it to be suspended under the aircraft wing, this pylon 4 could also be presented in a different configuration so that it could be mounted above this wing, and possibly even in the aft part of the aircraft fuselage.

The invention claimed is:

1. An engine attachment pylon for an aircraft, the pylon comprising:
   a rigid structure including a box, the box including an upper spar and a lower spar connected to each other by two lateral panels, the two lateral panels extending in a longitudinal direction of the engine,
   wherein each of the two lateral panels includes a web delimiting a side space inside the box where an upper end of the web faces the upper spar and a lower end of the web faces the lower spar,
   wherein at least one of the upper end of the web and the lower end of the web of at least one of the two lateral panels includes at least one assembly cleat projecting sideways from the web towards an outside of the box and in a direction substantially perpendicular to the longitudinal direction of the engine, and
   wherein the at least one assembly cleat is assembled to one of the upper spar and the lower spar via an attachment mechanism located outside the inner space of the box.

2. A pylon according to claim 1, wherein each of the lower end of the web and the upper end of the web of the two lateral panels includes at least one assembly cleat projecting sideways from the web towards the outside of the box and in a direction substantially perpendicular to the longitudinal direction of the engine, and
   wherein the at least one assembly cleat is assembled to one of the upper spar and the lower spar via an attachment mechanism located outside the inner space in the box.

3. A pylon according to claim 1, wherein each assembly cleat runs continuously along an associated one of the upper spar and the lower spar, along substantially an entire length of the associated spar.

4. A pylon according to claim 1, wherein the attachment mechanism includes bolts or rivets.

5. A pylon according to claim 1, further comprising two lateral aerodynamic skins fixed on the box of the rigid structure,
   wherein each of the two lateral aerodynamic skins faces the web of one of the two lateral panels and is at a distance away from the web.

6. A pylon according to claim 5, wherein each lateral skin and the lateral panel facing the lateral skin form a compartment of the pylon through which at least one of hydraulic and electrical systems pass.

7. A pylon according to claim 6, wherein the lateral skins and the lateral panels jointly form two pylon compartments arranged on each side of the inner space in the box, with hydraulic systems passing through one of the two compartments and electrical systems passing through the other of the two compartments.

8. A pylon according to claim 1, wherein the inner space forms a duct through which compressed air passes.

9. An engine assembly for an aircraft comprising:
an engine; and
an engine attachment pylon,
wherein the pylon is an attachment pylon according to claim 1.

10. An aircraft comprising at least one engine assembly according to claim 9.

11. An engine attachment pylon for an aircraft, the pylon comprising:
- a rigid structure including a box, the box including an upper spar and a lower spar connected to each other by two lateral panels; and
- two lateral aerodynamic skins fixed on the box of the rigid structure,
- wherein each of the two lateral panels includes a web delimiting a side space inside the box where an upper end of the web faces the upper spar and a lower end of the web faces the lower spar,
- wherein at least one of the upper end of the web and the lower end of the web of at least one of the two lateral panels includes at least one assembly cleat projecting sideways from the web towards an outside of the box,
- wherein the at least one assembly cleat is assembled to one of the upper spar and the lower spar via an attachment mechanism located outside the inner space of the box,
- wherein each of the two lateral aerodynamic skins faces the web of one of the two lateral panels and is at a distance away from the web, and
- wherein each lateral skin and the lateral panel facing the lateral skin form a compartment of the pylon through which at least one of hydraulic and electrical systems pass.

12. A pylon according to claim 11, wherein the lateral skins and the lateral panels jointly form two pylon compartments arranged on each side of the inner space in the box, with hydraulic systems passing through one of the two compartments and electrical systems passing through the other of the two compartments.

* * * * *